United States Patent
Singhal et al.

(10) Patent No.: US 10,942,649 B2
(45) Date of Patent: Mar. 9, 2021

(54) SYSTEM AND METHOD FOR BACKUP STORAGE GARBAGE COLLECTION

(71) Applicant: EMC IP Holding Company LLC, Hopkinton, MA (US)

(72) Inventors: Upanshu Singhal, Bangalore (IN); Archit Seth, Bangalore (IN); Shivakumar Kunnal Onkarappa, Bangalore (IN); Chakraveer Singh, Bangalore (IN); Chandra Prakash, Bangalore (IN); Kumari Priyanka, Bengaluru (IN); Rahul Bhardwaj, Udaipur (IN); Akansha Purwar, Bangalore (IN); Lalita Dabburi, Bangalore (IN); Manish Sharma, Bangalore (IN); Shelesh Chopra, Bangalore (IN); Sunil Yadav, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 50 days.

(21) Appl. No.: 16/022,622

(22) Filed: Jun. 28, 2018

(65) Prior Publication Data

US 2020/0004428 A1 Jan. 2, 2020

(51) Int. Cl.
*G06F 12/00* (2006.01)
*G06F 3/06* (2006.01)
*G06F 13/00* (2006.01)
*G06F 13/28* (2006.01)

(52) U.S. Cl.
CPC ............ *G06F 3/0608* (2013.01); *G06F 3/065* (2013.01); *G06F 3/0673* (2013.01)

(58) Field of Classification Search
CPC ....... G06F 3/0608; G06F 3/0673; G06F 3/065
See application file for complete search history.

(56) References Cited

U.S. PATENT DOCUMENTS

| | | | |
|---|---|---|---|
| 7,788,456 B1 * | 8/2010 | Park ................... | G06F 11/1448 711/161 |
| 9,229,818 B2 * | 1/2016 | Doshi ................. | G06F 11/1448 |
| 9,235,606 B1 | 1/2016 | Mooney et al. | |
| 9,977,704 B1 | 5/2018 | Chopra et al. | |
| 10,248,336 B1 * | 4/2019 | Koujalagi ............... | G06F 3/067 |
| 2003/0158831 A1 | 8/2003 | Zaremba | |
| 2004/0260973 A1 * | 12/2004 | Michelman ......... | G06F 11/1458 714/13 |

(Continued)

OTHER PUBLICATIONS

Extended European Search Report issued in corresponding European Application No. 19182218.8, dated Dec. 11, 2019.

*Primary Examiner* — Mark A Giardino, Jr.
(74) *Attorney, Agent, or Firm* — Chamberlain, Hrdlicka, White, Williams & Aughtry

(57) ABSTRACT

A storage for storing backups of virtual machines includes a persistent storage and a garbage collector. The persistent storage stores the backups. The garbage collector identifies an end of a backup generation session; in response to identifying the end of the backup generation session, the garbage collector performs a date analysis to identify a set of potentially stale backups of the backups; performs a continuity chain analysis of each backup of the set of potentially stale backups to identify a set of stale backups; and deletes each backup of the set of stale backups.

18 Claims, 14 Drawing Sheets

(56) References Cited

U.S. PATENT DOCUMENTS

| | | | |
|---|---|---|---|
| 2005/0246398 A1* | 11/2005 | Barzilai | G06F 11/1448 |
| 2008/0183642 A1* | 7/2008 | Akelbein | G06F 3/061 |
| | | | 706/3 |
| 2009/0249005 A1* | 10/2009 | Bender | G06F 11/1435 |
| | | | 711/162 |
| 2014/0095817 A1 | 4/2014 | Hsu et al. | |
| 2016/0117226 A1* | 4/2016 | Hetrick | G06F 11/1451 |
| | | | 711/162 |
| 2016/0125059 A1 | 5/2016 | Jain et al. | |
| 2017/0060886 A1* | 3/2017 | Adam | G06F 16/125 |

* cited by examiner

SYSTEM AND METHOD FOR BACKUP STORAGE GARBAGE COLLECTION

BACKGROUND

Computing devices generate, use, and store data. The data may be, for example, images, documents, webpages, or meta-data associated with the data. The data may be stored on a persistent storage. Stored data may be deleted from the persistent storage.

A backup of the data stored on a computing device may be backed up by storing it on a second computing device. The second computing device may be geographically separated from the computing device.

SUMMARY

In one aspect, a storage for storing backups of virtual machines in accordance with one or more embodiments of the invention includes a persistent storage and a garbage collector. The persistent storage stores the backups. The garbage collector identifies an end of a backup generation session; in response to identifying the end of the backup generation session, the garbage collector performs a date analysis to identify a set of potentially stale backups of the backups; performs a continuity chain analysis of each backup of the set of potentially stale backups to identify a set of stale backups; and deletes each backup of the set of stale backups.

In one aspect, a method for storing backups of virtual machines in accordance with one or more embodiments of the invention includes identifying an end of a backup generation session; in response to the identification of the end: performing a date analysis to identify a set of potentially stale backups of the backups; performing a continuity chain analysis of each backup of the set of potentially stale backups to identify a set of stale backups; and deleting each backup of the set of stale backups.

In one aspect, a non-transitory computer readable medium in accordance with one or more embodiments of the invention includes computer readable program code, which when executed by a computer processor enables the computer processor to perform a method for storing backups of virtual machines, the method includes identifying an end of a backup generation session; in response to the identification of the end: performing a date analysis to identify a set of potentially stale backups of the backups; performing a continuity chain analysis of each backup of the set of potentially stale backups to identify a set of stale backups; and deleting each backup of the set of stale backups.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
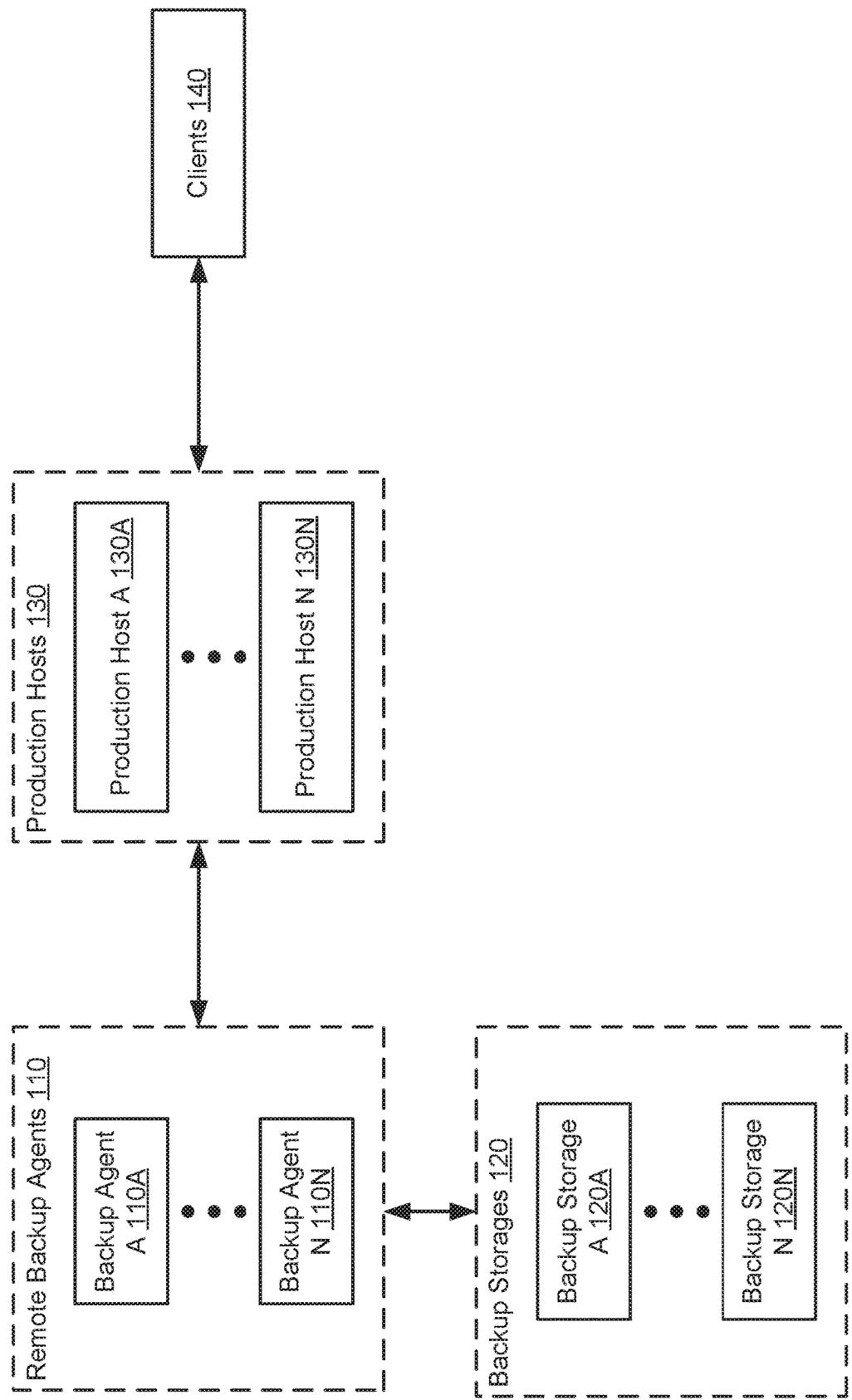
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for providing services to virtual machines. More specifically, the systems, devices, and methods may provide backup and restoration services to virtual machines.

In one or more embodiments of the invention, the system may generate easily identifiable continuity chains of backups that are dependent on one another. By generating easily identifiable continuity chains, breaks in the continuity chains may be identified using few computing resources, e.g., processor cycles, memory space, storage input-output (IO), etc.

In one or more embodiments of the invention, the system may automatically remove stored backups that are not members of continuity chains. Such backups may represent storage space that is storing useless data. As will be discussed below, due to power failures, low computing resource availability, or other factors, generation of backups may fail. In such cases, the data that is stored as a backup is functionally useless, e.g., unable to be used to perform a restoration. Thus, one or more embodiments of the invention may improve the operation of computing devices by increasing the free storage space of such devices.

In one or more embodiments of the invention, the system also remote stored backups stored on production hosts that are not members of continuity chains. Like the backups in the backup storage that are unusable for restoration purposes, similar backups in the production hosts may also be unusable.

In this manner, one or more embodiments of the invention may address the problem of computing device failure in a distributing that would otherwise impair the ability of the distributed to perform its functions. As will be discussed in greater detail below, embodiments may address multiple, additional problems beyond that of computing device failure in a distributed system.

FIG. 1 shows an example system in accordance with one or more embodiments of the invention. The system may include production hosts (130) that host virtual machines exposed to clients (140). The system may further include remote backup agents (110) that provide services to the production hosts. The services may include data storage in backup storages (120) and restorations of virtual machines using the data stored in the backup storages (120). Each component of the system of FIG. 1 may be operably connected via any combination of wired and wireless connections. Each component of the system is discussed below.

The clients (140) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The clients (140) may be other types of computing devices without departing from the invention. For additional details regarding computing devices, See FIG. 9.

The clients (140) may interact with virtual machines hosted by the production hosts (130). For example, the virtual machines may host databases, email servers, or any other type of application. The clients (140) may utilize services provided by these or other applications. In another example, the clients (140) may directly operate the virtual machines, e.g., a virtualized environment. In such a scenario, the clients (140) may operate as terminals for accessing the virtual machines.

In one or more embodiments of the invention, the production hosts (130) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The production hosts (130) may be other types of computing devices without departing from the invention. For additional details regarding computing devices, See FIG. 9.

In one or more embodiments of the invention, the production hosts (130) are distributed computing devices. As used herein, a distributed computing device refers to functionality provided by a logical device that utilizes the computing resources of one or more separate and/or distinct computing devices. For example, in one or more embodiments of the invention, the production hosts (130) may be distributed devices that include components distributed across a number of separate and/or distinct computing devices. In such a scenario, the functionality of the production hosts (130) may be performed by multiple different computing devices without departing from the invention.

In one or more embodiments of the invention, the production hosts (130) host virtual machines. The production hosts (130) may host any number of virtual machines without departing from the invention. The production hosts (130) may also host agents, or other executing components, for orchestrating the operation of the hosted virtual machines. For additional details regarding the production hosts (130), See FIG. 2.

In one or more embodiments of the invention, the remote backup agents (110) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of remote backup agents (110) described in this application and all, or a portion thereof, of the methods illustrated in FIGS. 6A-7. The remote backup agents (110) may be other types of computing devices without departing from the invention. For additional details regarding computing devices, See FIG. 9.

In one or more embodiments of the invention, the remote backup agents (110) are distributed computing devices. As used herein, a distributed computing device refers to functionality provided by a logical device that utilizes the computing resources of one or more separate and/or distinct computing devices. For example, in one or more embodiments of the invention, the remote backup agents (110) may be distributed devices that include components distributed across a number of separate and/or distinct computing devices. In such a scenario, the functionality of the remote backup agents (110) may be performed by multiple different computing devices without departing from the invention.

In one or more embodiments of the invention, the remote backup agents (110) provide services to virtual machines. The services may include storing virtual machine data, generating backups of the virtual machines, and/or performing restorations of virtual machines.

In one or more embodiments of the invention, the backup storages (120) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device that cause the computing device to provide the functionality of the backup storages (120) described through this application and all, or a portion, of the methods illustrated in FIG. 6A-7. For additional details regarding computing devices, See FIG. 9.

In one or more embodiments of the invention, the backup storages (120) are distributed computing devices. As used herein, a distributed computing device refers to functionality provided by a logical device that utilizes the computing resources of one or more separate and/or distinct computing devices. For example, in one or more embodiments of the invention, the backup storages (120) may be distributed devices that include components distributed across a number of separate and/or distinct computing devices. In such a scenario, the functionality of the backup storages (120) may be performed by multiple different computing devices without departing from the invention.

In one or more embodiments of the invention, the backup storages (120) store data from the production hosts (130). The data may be, for example, backups of virtual machines. In one or more embodiments of the invention, a backup of a virtual machine is a data structure that reflects a state of a virtual machine at a predetermined point in time or changes to a state over a period of time. For example, a backup of a virtual machine may be an image of the virtual machine, a difference disk of the virtual machine, a log of an application executing on the virtual machine, or other types of data structures. An image of a virtual machine may include all of the virtual machine data at a point in time. A difference disk may be the changes made to virtual machine data over a period of time. A log may be changes made to application data made over a period of time. The backup of a virtual machine may be other types of data structures that may be used to restore a virtual machine to a previous state without departing from the invention.

Multiple backups of varying types may be used to restore a virtual machine to a previous state. For example, a virtual machine image may be used to restore a virtual machine to a state of the virtual machine at the time the image was generated. In another example, a virtual machine image and a difference disk for a period of time immediately following the point in time associated with the image may be used to restore a virtual machine to a state of the virtual machine at the end of the period of time following the point in time.

In such a scenario, the virtual machine image and difference disk may form a continuity chain. In one or more embodiments of the invention, a continuity chain is a number of backups that are each associated with different periods of time that form a continuous lineage, e.g., the periods of time associated with the backups cover a continuous portion of a timeline. For example, a first backup may be associated with May 12 and a second backup may be associated with May 13-May 17. Thus, the combination of the first backup and the second backup cover the period of May 12-May 17. The backups may be used to restore the virtual machine to any point in time between May 12 and May 17. The backup storages (120) may store additional or different data from backups of virtual machines without departing from the invention.

In one or more embodiments of the invention, backup storages (120) may perform a garbage collection process to reclaim storage space. The storage space may be local, e.g., on the backup storage, or remote, e.g., on a production host. For example, in some cases backups of virtual machines may be stored in the backup storages and/or the production hosts that are unable to be used to restore a virtual machine. For example, a portion of the system of FIG. 1 may fail, be overburdened, or may otherwise not be capable of completing a backup of a virtual machine resulting in backups being stored that are unusable for restoration purposes. In such a scenario, the useless backups consume storage space without providing utility to the system.

In one or more embodiments of the invention, the backup storages (120) may identify useless backups and remove them, i.e., reclaim the storage space. The backup storages (120) may identify the useless backups by analyzing the continuity chain of the backup, i.e., whether the backup is linked to other backups. The continuity chain may include a characteristic that is indicative of whether the backup is linked to other backups. A characteristic may be, for example, a naming convention for a backup, metadata associated with the backup, a predetermined bit sequence of the backup, or another data structure that indicates. In a scenario in which a naming convention is used, the naming convention may include a predetermined number of characters that identify another backup. When the aforementioned predetermined number of characters is present, a linking between the backup and another backup may be identified. The presence of the linking may be used to infer that the backup is a portion of a continuity chain.

In one or more embodiments of the invention, the backup storages (120) interrogate multiple backups in a priority chain to identify whether a backup is a member of a continuity chain. For example, in some scenarios, it may be possible for a first backup to be linked to a second backup, but the second backup is not linked to a third backup. In such a scenario, both the first and second backup may, in fact, not be a part of a continuity chain. The backup storages (120) may interrogate all, or a portion, of the members of a continuity chain to identify whether a backup is a member of a useful continuity chain. In other words, the mere presence of a linking between two backups may not indicate that both backups are members of a continuity chain.

In one or more embodiments of the invention, backups are interrogated by determining whether they are linked to other backups, i.e., members of a continuity chain. The interrogation may be accomplished by, for example, determining whether any portion of the backups indicates an association with other backups or that the backup is intentionally not a member of a continuity chain at the time of interrogation, e.g., a first backup in a chain that will be further developed over time.

In one or more embodiments of the invention the backup storages (120) are deduplicated storages. A deduplicated storage may attempt to increase the quantity of data that it can store by only storing copies of unique data. When storing data in a deduplicated storage, the data may first be checked to determine whether it is duplicative of data already stored in the backup storage. Only the unique portions of the data may be stored in the backup storage. Storing and accessing data in a deduplicated storage may be significantly more computing resource costly than storing data in a non-deduplicated storage. For additional details regarding backup storages, See FIGS. 3-4.

Figure 2:
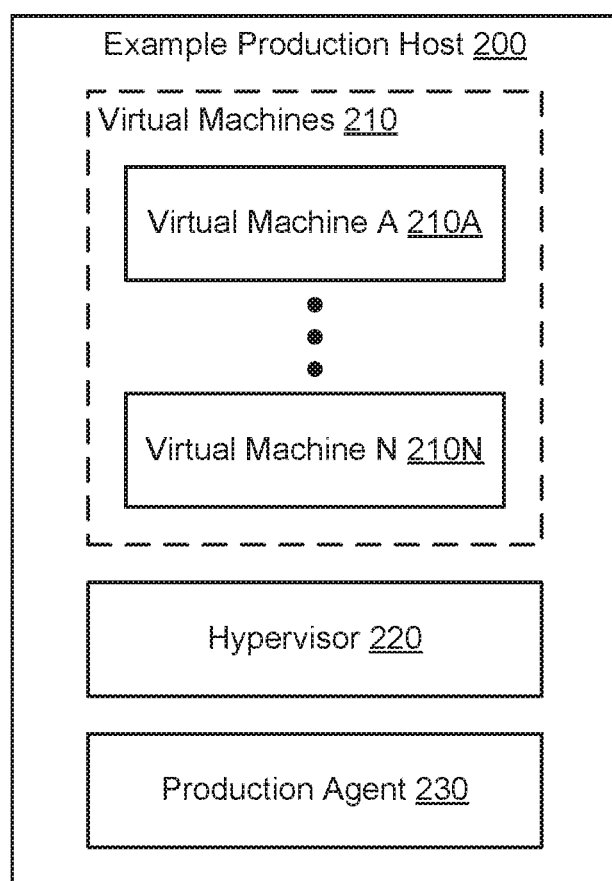
FIG. 2 shows a diagram of an example production host in accordance with one or more embodiments of the invention.

As discussed above, the backup storages may store data obtained from the production hosts (130). FIG. 2 shows a diagram of an example production host (200) in accordance with one or more embodiments of the invention.

In one or more embodiments of the invention, the example production host (200) hosts virtual machines (210). The example production hosts (200) may host any number of virtual machines (210A, 210N) without departing from the invention.

In one or more embodiments of the invention, the virtual machines (210) execute using computing resources of the example production host (200). For example, each of the virtual machines (210) may be allocated a portion of the processing resources, memory resources, and/or storage resources of the example production host (200).

In one or more embodiments of the invention, an image of each of the virtual machines (210) at points in time in the past may be stored, i.e., stored locally on a production host hosting the respective virtual machine. Following the points in time in the past, a differencing disk that stores each of the changes made from the image of each of the virtual machines (210) may be stored. The aforementioned images and differencing disks may be stored locally or in a backup storage.

In one or more embodiments of the invention, logs associated with applications hosted by the virtual machines (210) may be generated. A log may reflect changes to application data. Logs may be used in combination with virtual machine images and/or differencing disks to restore virtual machines to predetermined states and/or applications to predetermined states.

In one or more embodiments of the invention, generating a backup of a virtual machine includes storing a copy of the image of the virtual machine, a differencing disk, and/or a log of one or more applications hosted by the virtual machine in a backup storage. Thus, when performing a restoration of a virtual machine, the differencing disks and/or logs may be merged with a virtual machine image to obtain a representation of the virtual machine and/or application at the point in time following the periods of time reflected by each of the differencing disks and/or logs.

In one or more embodiments of the invention, copies of the virtual machine, differencing disk, and/or log of one or more applications may be temporarily stored locally as part of a backup processes before being stored in a backup storage. Failure of all or a portion of the system of FIG. 1 at that time may result in the copies being incomplete and/or unlinked to other backups in a continuity chain. Consequently such backups may be unusable for restoration purposes and needlessly consume storage space on the production host. Embodiments of the invention may improve the operation of production hosts, and distributed computing system more generally, by providing a method of identifying and removing unusable data, in the form of backups, thereby improving the efficiency of use of storage space of the production hosts.

In one or more embodiments of the invention, the example production host (200) includes a hypervisor (220) that manages the execution of the virtual machines (210). The hypervisor (220) may instantiate and/or terminate any of the virtual machines (210).

In one or more embodiments of the invention, the hypervisor (220) is a hardware device including circuitry. The hypervisor (220) may be, for example, a digital signal processor, a field programmable gate array, or an application specific integrated circuit. The hypervisor (220) may be other types of hardware devices without departing from the invention.

In one or more embodiments of the invention, the hypervisor (220) is implemented as computing code stored on a persistent storage that when executed by a processor performs the functionality of the hypervisor (220). The processor may be a hardware processor including circuitry such as, for example, a central processing unit or a microcontroller. The processor may be other types of hardware devices for processing digital information without departing from the invention.

The example production host (200) may include a production agent (230) that manages the storage of virtual machine data, e.g., images, difference disks, and logs, in a backup storage. The production agent (230) may issue commands to the hypervisor (220) to control the operation of a virtual machine when attempting to store virtual machine data. For example, the production agent (230) may initiate the processes of generating a backup package, i.e., data that reflects a state of an entity and enables the entity to be restored to the state, for a virtual machine, an application, or other entity executing on the example production host (200). Similarly, the production agent (230) may initiate restorations of virtual machines, applications, or other entities.

In one or more embodiments of the invention, the production agent (230) is a hardened entity, i.e., not modifiable by an entity that is remote to a production host on which the production agent (230) is executing. The production agent (230) may have a set, finite number of predefined functions that may be invoked by a remote entity. In one or more embodiments of the invention, the production agent (230) is not configurable by modifying settings or associated configuration files via a remote terminal or other configuration utility.

In one or more embodiments of the invention, the production agent (230) is a hardware device including circuitry. The production agent (230) may be, for example, digital signal processor, a field programmable gate array, or an application specific integrated circuit. The production agent (230) may be other types of hardware devices without departing from the invention.

In one or more embodiments of the invention, the production agent (230) is implemented as computing code stored on a persistent storage that when executed by a processor performs the functionality of the production agent (230). The processor may be hardware processor including circuitry such as, for example, a central processing unit or a microcontroller. The processor may be other types of hardware devices for processing digital information without departing from the invention.

Figure 3:
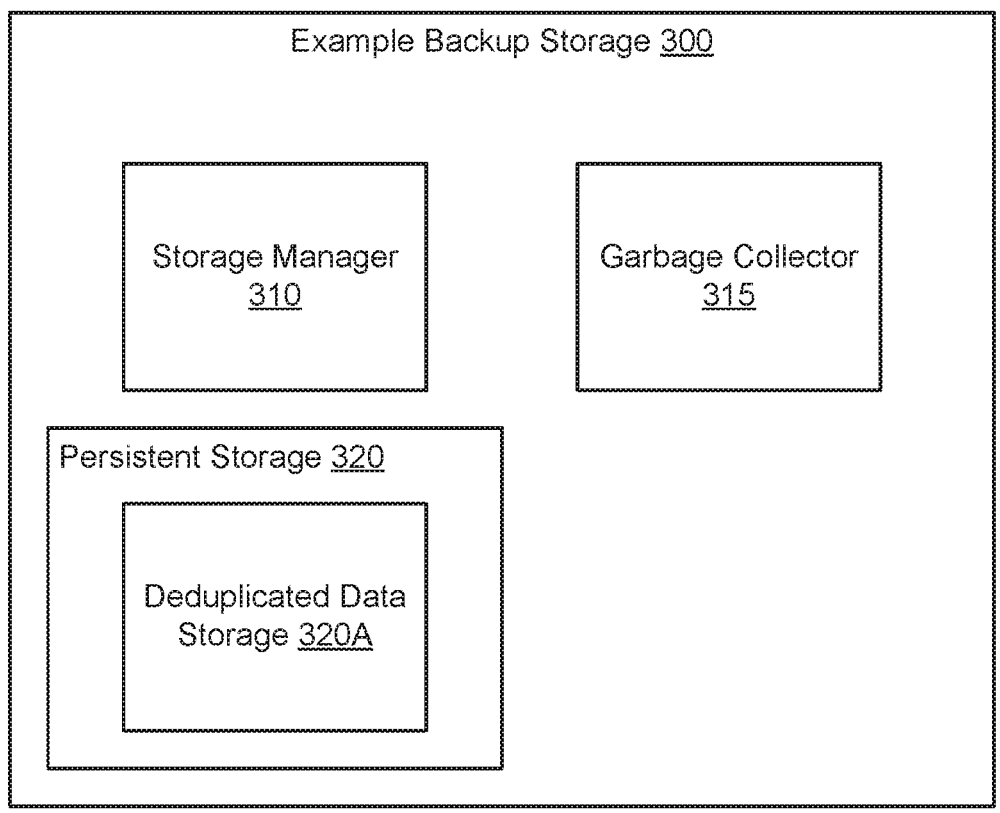
FIG. 3 shows a diagram of an example backup storage in accordance with one or more embodiments of the invention.

When generating a backup or performing a restoration of a virtual machine, a remote backup agent may store or access data in a backup storage. FIG. 3 shows a diagram of an example backup storage (300) in accordance with one or more embodiments of the invention.

In one or more embodiments of the invention, the example backup storage (300) stores data from remote backup agents or other entities. For example, a remote backup agent may send data to the example backup storage (300) for storage. In some cases, an example backup storage (300) may store data obtained from a production host. In such a scenario, the remote backup agent may orchestrate the process, i.e., instructs the production host to store the data in the example backup storage (300). The data may be, for example, backups of virtual machines.

In one or more embodiments of the invention, the example backup storage (300) provides previously stored data to remote backup agents or other entities. For example, a remote backup agent may initiate a restoration of a virtual machine. The remote backup agent may send an instruction to the example backup storage (300) or the computing device where the restoration of the virtual machines will be performed to provide or obtain, respectively, data in the example backup storage (300). The obtained data may be used to perform the restoration.

In one or more embodiments of the invention, the example backup storage (300) performs garbage collection on stored backups. Performing garbage collection may include performing a date analysis to identify a portion of the stored backups, performing a continuity analysis on the portion of the stored backups to identify stale backups, and deleting the identified stale backups.

In one or more embodiments of the invention, the example backup storage (300) may also, or in the alternative, remove similar stored backups from production hosts. As described with respect to FIG. 2, unusable backups may also be present on the production hosts. The example backup storage (300) may perform a similar analysis extended to backups also stored on production hosts and remove any backups that are unusable for restoration purposes.

To provide the aforementioned functionality, the example backup storage (300) may include a storage manager (310), a garbage collector (315), and a persistent storage (320) storing data structures used by the storage manager (310) and garbage collector (315).

In one or more embodiments of the invention, the storage manager (310) manages the storage of data in and the retrieval of data from the persistent storage (320). In one or more embodiments of the invention, the data stored in the persistent storage (320) may be deduplicated before storage. In such a scenario, the storage manager (310) may compare to-be-stored data to already stored data and only store unique portions of the to-be-stored data. A unique portion may be a portion of the to-be-stored data that is not duplicative of data already stored in the persistent storage (320). For example, after storing a first draft of a text document in the persistent storage (320), minor changes may be made to the first draft. When the first draft is then stored again in the persistent storage (320), the storage manager (310) may only store the portions of the first draft that were changed. Thereby, more data may be stored in the persistent storage (320) when compared to storing data in the persistent storage (320) without performing deduplication of the data. Deduplication consuming significant computing resource including processing cycles, memory cycles, and/or storage input-output.

In one or more embodiments of the invention, the storage manager (310) adds stored backups to existing continuity chains after the backup is properly stored in the persistent storage (320). For example, the storage manager (310) may apply a naming convention to the stored backup, add meta data regarding the stored backup, or otherwise specify whether the stored backup is linked to another backup. Backups including images of virtual machines may not be linked to earlier backups and, consequently, may be regarded as anchors. Anchor backups may be members of continuity chains without being linked to earlier backups, i.e., backups reflecting an earlier state of a virtual machine. Thus, a continuity chain may include an anchor backup and any number of other backups linked to the anchor backup.

Figure 7:
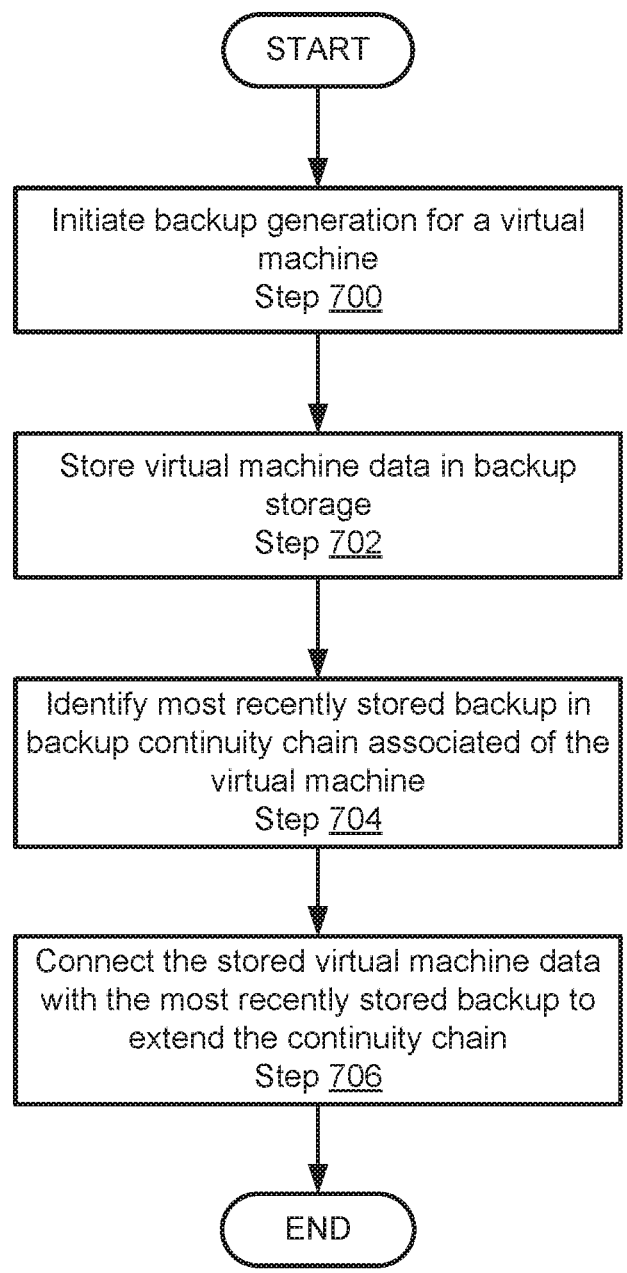
FIG. 7 shows a flowchart of a method of storing a backup in accordance with one or more embodiments of the invention.

To provide the aforementioned functionality, the storage manager (310) may perform all, or a portion, of the method illustrated in FIG. 7.

In one or more embodiments of the invention, the storage manager (310) is a hardware device including circuitry. The storage manager (310) may be, for example, a digital signal processor, a field programmable gate array, or an application specific integrated circuit. The storage manager (310) may be other types of hardware devices without departing from the invention.

In one or more embodiments of the invention, the storage manager (310) is implemented as computing code stored on a persistent storage that when executed by a processor performs the functionality of the storage manager (310). The processor may be hardware processor including circuitry such as, for example, a central processing unit or a microcontroller. The processor may be other types of hardware devices for processing digital information without departing from the invention.

In one or more embodiments of the invention, the garbage collector (315) identifies useless backups and deletes the identified useless backups. To identify the useless backups, the garbage collector (315) may perform a date analysis of the backups stored in backup storage to identify potentially stale backups. A continuity analysis may be performed on the potentially tale backups to identify the actually stale backups, i.e., not usable to perform a restoration of a virtual machine. The actually stale backups may then be deleted.

Figure 6A:
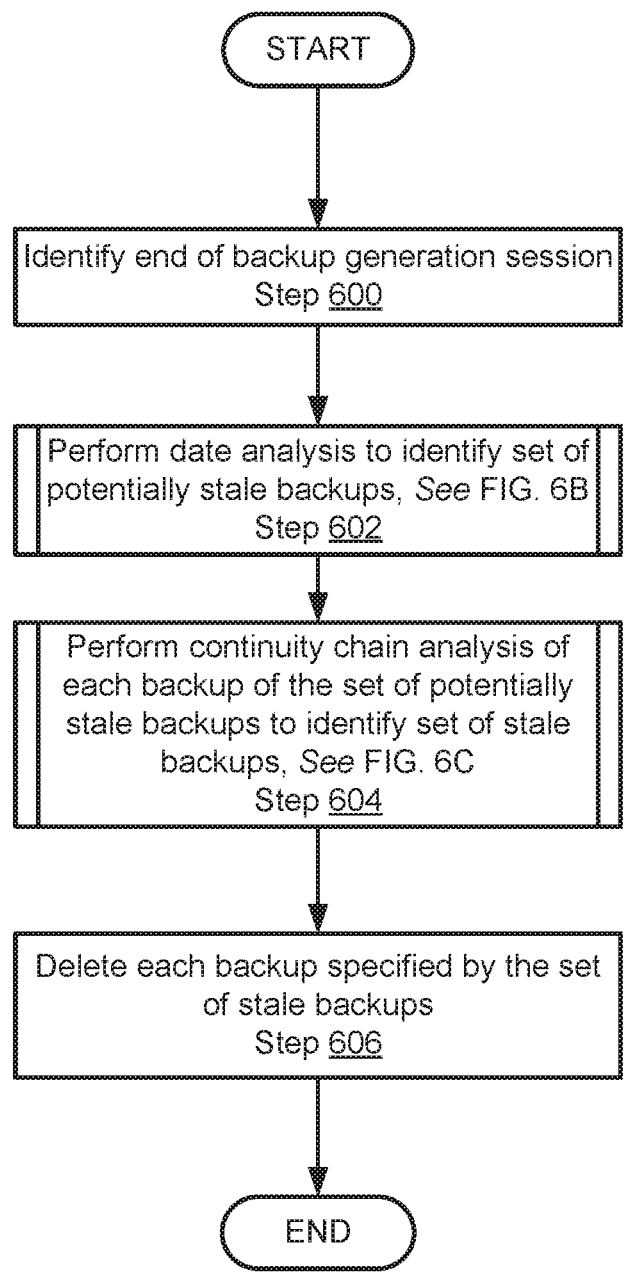
FIG. 6A shows a flowchart of a method of deleting stale backups in accordance with one or more embodiments of the invention.
Figure 6B:
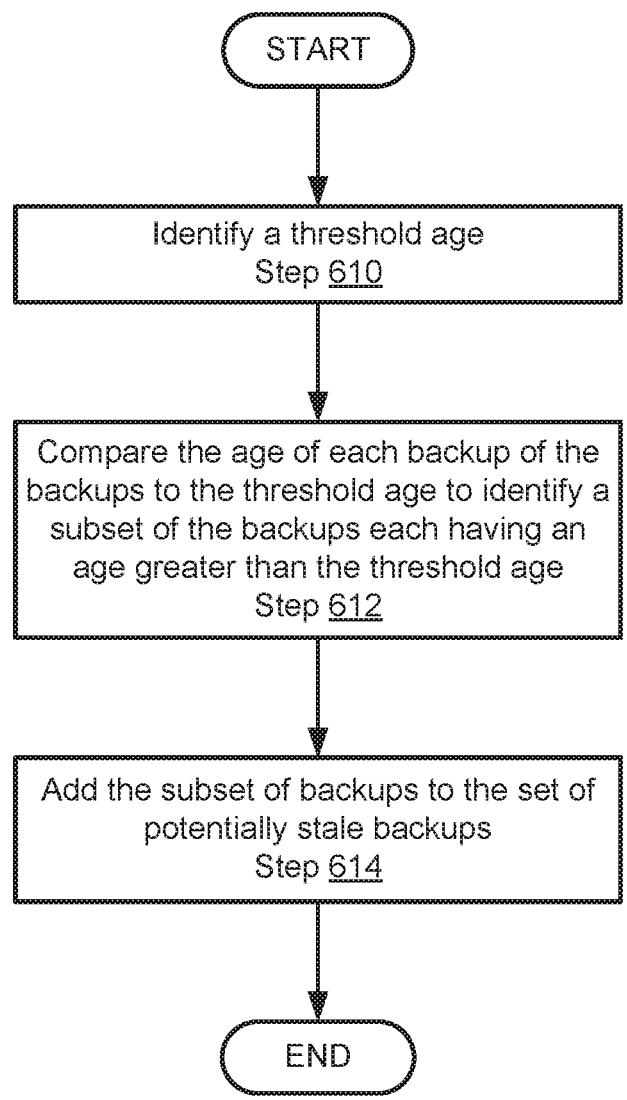
FIG. 6B shows a flowchart of a method of performing a date analysis in accordance with one or more embodiments of the invention.
Figure 6C:
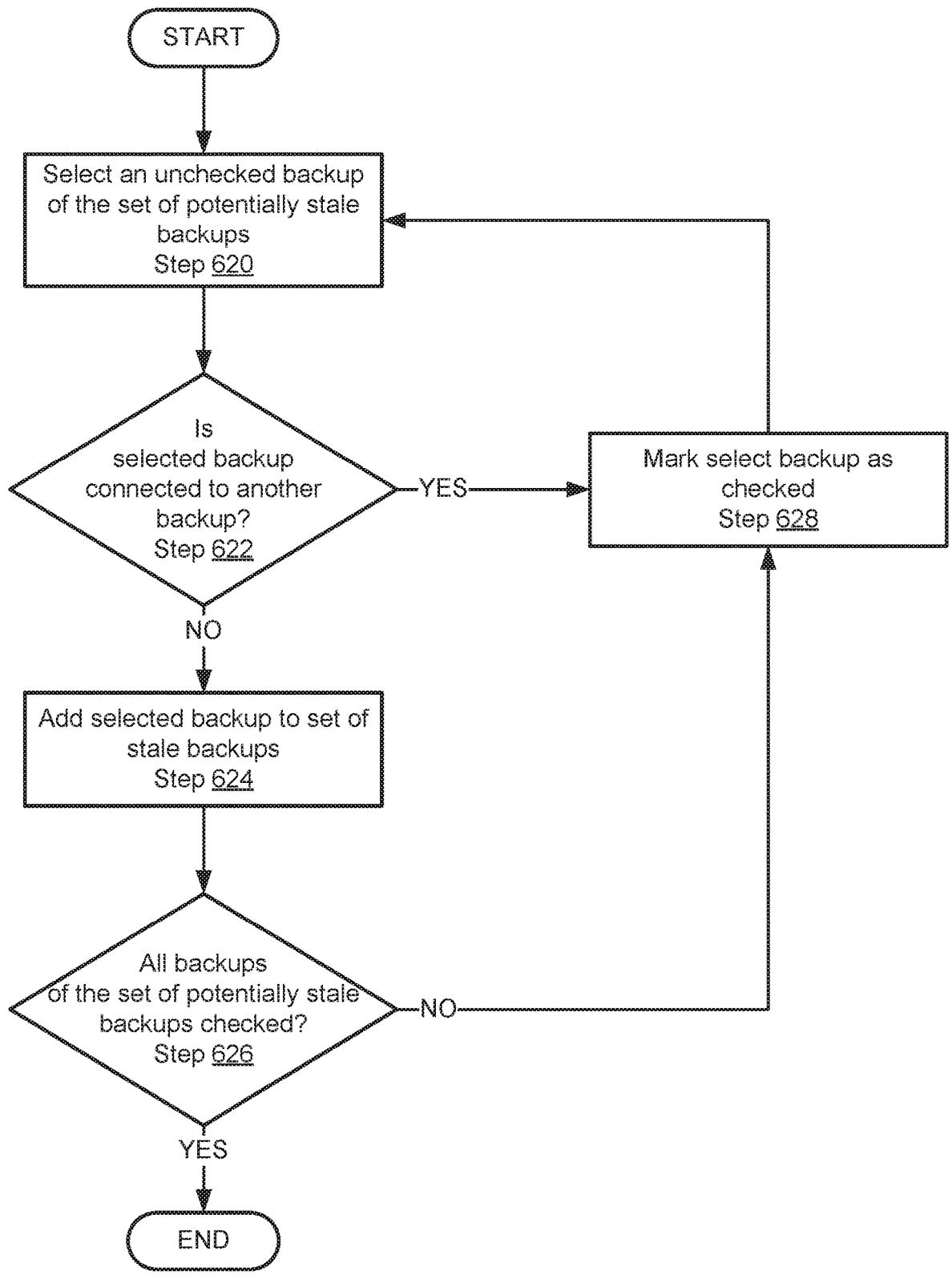
FIG. 6C shows a flowchart of a method of performing continuity chain analysis in accordance with one or more embodiments of the invention.

To provide the aforementioned functionality, the garbage collector (315) may perform all, or a portion, of the method illustrated in FIG. 6A-6C.

In one or more embodiments of the invention, the garbage collector (315) is a hardware device including circuitry. The garbage collector (315) may be, for example, a digital signal processor, a field programmable gate array, or an application specific integrated circuit. The garbage collector (315) may be other types of hardware devices without departing from the invention.

In one or more embodiments of the invention, the garbage collector (315) is implemented as computing code stored on a persistent storage that when executed by a processor performs the functionality of the garbage collector (315). The processor may be hardware processor including circuitry such as, for example, a central processing unit or a microcontroller. The processor may be other types of hardware devices for processing digital information without departing from the invention.

In one or more embodiments of the invention, the persistent storage (320) is a storage device that stores data structures. The persistent storage (320) may be a physical or virtual device. For example, the persistent storage (320) may include solid state drives, solid state drives, tape drives, and other components to provide data storage functionality. Alternatively, the persistent storage (320) may be a virtual device that utilizes the physical computing resources of other components to provide data storage functionality. By doing so, the computing load placed on the backup storages for performing garbage collection may be reduced when compared to other methods. Accordingly, embodiments of the invention may improve the operation of computing devices by freeing processor cycles, memory cycles, input/output of storage, and/or inter-device bandwidth that would otherwise be used. Similarly, embodiments of the invention may free storage space that would otherwise be consumed and, thereby, provide an improved computing device with more storage space than conventional computing devices.

In one or more embodiments of the invention, the persistent storage (320) stores a deduplicated data storage (320A). The deduplicated data storage (320A) may be a data structure that includes data necessary to regenerate previously stored data structures, i.e., previously stored backups. To regenerate a previously stored data structure, multiple pieces of different unique data stored in the deduplicated data storage (320A) may be combined.

As discussed with respect to the storage manager (310), a deduplicated storage may only store copies of unique data. In such a scenario, each copy of a unique data may represent a portion of multiple data structures that were previously stored in the deduplicated data storage (320A). Thus, a copy of a unique piece of data stored in the deduplicated data storage (320A) may be used to regenerate multiple pieces of previously stored data, e.g., multiple previously stored backups.

The deduplicated data storage (320A) may store unique pieces of data in any format without departing from the invention. Additionally, while the persistent storage (320) is illustrated as only including the deduplicated data storage (320A), the persistent storage (320) may include other data without departing from the invention.

Figure 4:
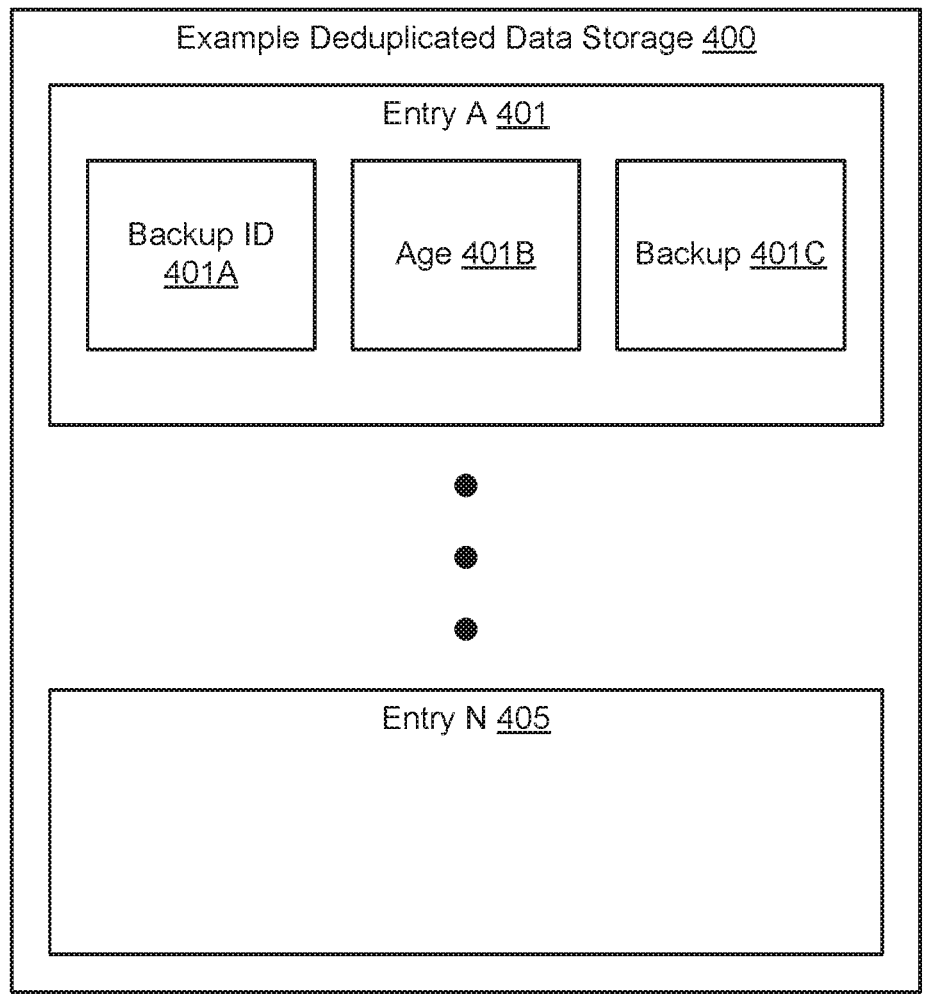
FIG. 4 shows a diagram of an example deduplicated data storage in accordance with one or more embodiments of the invention.

As discussed above, the deduplicated data storage (320A) may store backups. FIG. 4 shows a diagram of an example deduplicated data storage (400) in accordance with one or more embodiments of the invention. The diagram in FIG. 4 is an illustrative diagram of the data stored in the example deduplicated data storage (400) and is not representative of the actually stored segments of the deduplicated data.

In one or more embodiments of the invention, the example deduplicated data storage (400) includes a number of entries (401, 405). The entries may store backups (e.g., 401C) and data regarding the stored backup. The data regarding the backup may include a backup identifier (401A), e.g., a file name, and an age (401B) of the stored backup. The age (401B) may be used to identify how long the backup (401C) has been stored and/or a creation date of the backup (401C). The backup identifier (401A) may be an identifier used by the system to identify the backup (401C).

In one or more embodiments of the invention, the backup identifier (401A) reflects whether the backup (401C) is a portion of a continuity chain, in addition to providing an identity of the backup (401C). In other words, some of the characters of the backup identifier (401A) may enable it to be determined whether the backup (401C) is linked to another backup. For example, some of the characters of the backup identifier (401A) may include an identifier of another backup. By doing so, embodiments of the invention may provide an efficient method of determining whether a backup (e.g., 401C) is a portion of a continuity chain.

Figure 5:
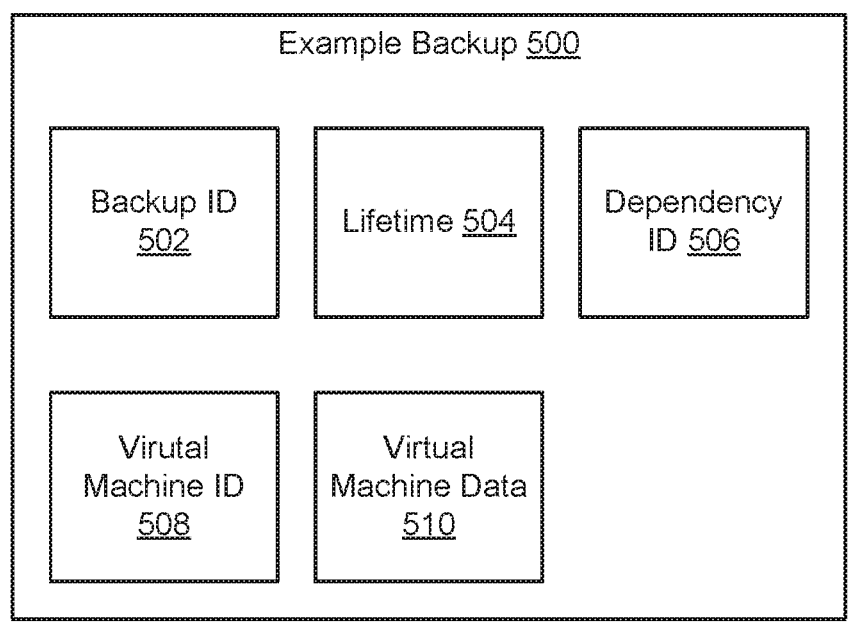
FIG. 5 shows a diagram of an example backup in accordance with one or more embodiments of the invention.

To further clarify backups, FIG. 5 shows a diagram of an example backup (500) in accordance with one or more embodiments of the invention. The example backup (500) may include a backup identifier (502), a lifetime (504), a dependency identifier (506), a virtual machine identifier (508), and virtual machine data (501).

The backup identifier (502) may be the same as the backup identifier (401A, FIG. 4). In other words, the example backup (500) may include a copy of the backup identifier (401A, FIG. 4), the example backup (500) may include the only copy of the backup identifier (401A, FIG. 4), or the example backup (500) may not include a copy of the backup identifier (401A, FIG. 4).

The lifetime (504) may specify an age of the example backup (500). The age may be the duration of time since the example backup (500) was stored in a backup storage. The age may be the duration of time since the example backup (500) was generated. The age may specify a time at which the example backup (500) was stored in a backup storage. The age may specify the time at which the example backup (500) was generated. The lifetime (504) may include any type of information that enables an age, e.g., an indication of how lone the virtual machine data (510) has been stored, of the virtual machine data (510) to be determined.

The dependency identifier (506) may include information that enables a second backup, on which the example backup (500) depends, to be identified. The dependency identifier (506) may be, for example, an identifier of the second backup. The dependency identifier (506) may be other types of information that enable the second backup to be identified without departing from the invention.

The virtual machine identifier (508) may enable a virtual machine associated with the virtual machine data (510) to be identified. The association may be that the virtual machine data (510) is a backup of the virtual machine identified by the virtual machine identifier (508). The virtual machine identifier (508) may be, for example, a uniform resource identifier that uniquely discriminates a virtual machine from all other virtual machines. The virtual machine identifier (508) may be other types of identifiers without departing from the invention.

The virtual machine data (510) may be a backup of a virtual machine specified by the virtual machine identifier (508). The virtual machine data (501) may be, for example, an image of the virtual machine, a difference disk of the virtual machine, a log of an application executing on the virtual machine, or other types of data structure that may be used to restore a virtual machine, or a portion of thereof, to a previous state.

While the data structures of FIG. 4-5 have been illustrated as separate data structures, the aforementioned data structures may be combined with other data without departing from the invention. Additionally, while the aforementioned data structures are illustrated as being stored on the example backup storage (300), the data structures may be stored on persistent storage of other devices without departing from the invention.

Additionally, while the data structure illustrated in FIGS. 4-5 are shown as a list of entries, the data structures may be stored in other formats, may be divided into multiple data structures, and/or portion of the data structures may be distributed across multiple computing devices without departing from the invention.

As discussed above, components of the system of FIG. 1 may perform methods of generating and storing backups as well as performing garbage collection on the stored backups, in addition to other functions. FIGS. 6A-7 show methods in accordance with one or more embodiments of the invention that may be performed by components of the system of FIG. 1.

FIG. 6A shows a flowchart of a method in accordance with one or more embodiments of the invention. The method depicted in FIG. 6A may be used to remove stale backups from backup storage in accordance with one or more embodiments of the invention. The method shown in FIG. 6A may be performed by, for example, a backup storage (e.g., 120, FIG. 1). Other components of the system illustrated in FIG. 1 may perform the method of FIG. 6A without departing from the invention.

In Step 600, the end of a backup generation session is identified.

In one or more embodiments of the invention, the end of the backup generation session is identified by receiving a notification from a backup agent that a backup generation session has completed. A backup generation session may be a period of time during which a backup agent is orchestrating the generation and storage of a backup in a backup storage.

The end of the backup generation session may be identified via other methods without departing from the invention. For example, a backup storage may monitor the remote backup agents (e.g., 110, FIG. 1) for backup generation activity. When backup generation activity comes to an end the end of the backup generation session may be identified.

In Step 602, a date analysis is performed to identify a set of potentially stale backups.

In one or more embodiments of the invention, the identified set of potentially stale backups includes a portion of the backups of the backup storage that are more likely than other backups to be stale. In other words, the potentially stale backups include a sub-set of the backups of a backup storage. The potentially stale backups may also include backups stored on production hosts or, alternatively, only backups stored on production hosts.

In one or more embodiments of the invention, the set of potentially stale backups includes less than a predetermined percentage of the backups stored in the backup storage. The predetermined percentage may be 50%. In one or more embodiments of the invention, the predetermined percentage is 10%.

In one or more embodiments of the invention, performing a data analysis is a low computing resource consumption activity. In other words, the analysis may be performed with little impact on the operation of the backup system.

In one or more embodiments of the invention, the date analysis is performed via the method illustrated in FIG. 6B. The date analysis may be performed via other methods to identify the set of potentially stale backups without departing from the invention.

In Step 604, a continuity chain analysis of each backup of the identified set of potentially stale backups is performed to identify a set of stale backups.

In one or more embodiments of the invention, the identified set of stale backups includes a portion of the backups of the backup storage that unusable for virtual machine restoration purposes.

In one or more embodiments of the invention, the set of stale backups also include backups stored on production hosts, e.g., copies of the backups that were not removed as part of a previously performed backup generation process.

In one or more embodiments of the invention, the set of stale backups only includes backups stored on production hosts, e.g., backups that were not removed as part of a previously performed backup generation process.

In one or more embodiments of the invention, performing a continuity chain analysis is a higher computing resource consumption activity than performing the date analysis of Step 602. In other words, the performing the continuity chain analysis may have a more negative impact on the performance of the backup storage than the date analysis. By performing a date analysis, before a continuity chain analysis, embodiments of the invention provide an improved computing device by freeing computing resource of the backup storage when compared to only performing a continuity chain analysis on all of the backups of the backup storage.

In one or more embodiments of the invention, the continuity chain analysis is performed via the method illustrated in FIG. 6C. The continuity chain analysis may be performed via other methods to identify the set of stale backups without departing from the invention.

In Step 606, each backup specified by the set of stale backups is deleted. By deleting the stale backups, one or more embodiments of the invention may provide an improved computing device, e.g., a backup storage that has higher available storage capacity when compared to computing devices that do not delete stale backups. Thus, embodiments of the invention improve the operation of the computing device by providing high storage capacity or more efficient use of existing storage capacity. Other computing resources of the computing device may also be improved, e.g., improved processor cycle availability, improved storage input-output availability, etc., by removing backups. As noted with respect to FIG. 3, the backups may be stored in a deduplicated storage which, consequently, has a computing resource overhead (e.g.i, processor cycles/memory space consumed for checking to identify whether data is unique) that increases as the side of the deduplicated storage increases. Thus, removing backups that are unusable for restoration purposes may also reduce the computational overhead The method may end following Step 606.

FIG. 6B shows a flowchart of a method in accordance with one or more embodiments of the invention. The method depicted in FIG. 6B may be used to perform a date analysis to identify a set of potentially stale backups in accordance with one or more embodiments of the invention. The method shown in FIG. 6B may be performed by, for example, a backup storage (e.g., 120, FIG. 1). Other components of the system illustrated in FIG. 1 may perform the method of FIG. 6B without departing from the invention.

In Step 610, a threshold age is identified.

In one or more embodiments of the invention, the threshold age is predetermined. The predetermined age may be, for example, 1 month. Other predetermined ages may be used without departing from the invention.

In one or more embodiments of the invention, the threshold age may be identified based on a statistical characterization of the ages of the backups in the backup storage. In one or more embodiments of the invention, the statistic characterization of the ages is the average age. In one or more embodiments of the invention, the statistic characterization of the ages is the mode of ages. In one or more embodiments of the invention, the statistic characterization of the ages is the average age plus one to three standard deviations of the ages.

In one or more embodiments of the invention, the threshold age is the 90 percentile of the ages of the backups stored in the backup storages, e.g., an age that includes the top 10% of the backups that are the oldest. Other percentile rankings may be used without departing from the invention.

In Step 612, the age of each backup of the backups is compared to the threshold age to identify a subset of the backups that each has an age greater than the threshold age. The backups may be local backups, e.g., stored in backup storage, and/or remote backups, e.g., stored in production hosts.

In Step 614, the subset of the backups is added to the set of potentially stale backups.

The method may end following Step 614.

FIG. 6C shows a flowchart of a method in accordance with one or more embodiments of the invention. The method depicted in FIG. 6C may be used to perform a continuity chain analysis to identify a set of stale backups in accordance with one or more embodiments of the invention. The method shown in FIG. 6C may be performed by, for example, a backup storage (e.g., 120, FIG. 1). Other components of the system illustrated in FIG. 1 may perform the method of FIG. 6C without departing from the invention.

Prior to Step 620, all backups of the set of potentially stale backups are considered to be unchecked.

In Step 620, an unchecked backup of the set of potentially stale backups is selected. The unchecked backup may be selected using any method without departing from the invention.

In Step 622, it is determined whether the selected unchecked backup is connected to another backup or independent.

In one or more embodiments of the invention, the selected unchecked backup is checked by determined whether the selected unchecked backup includes an identifier of backup. The identifier of the another backup may be included, for example, in the name of the backup, in an identifier of the backup, in meta data regarding the backup, or at another location associated with the backup. The presence of an identifier of another backup indicates that the backup is linked to another backup. Linked backups are considered to be connected.

If the backup does not include an identifier of another backup, a type of backup is determined. If the type of the backup is not connectable, e.g., a virtual machine image that cannot depend on another backup, the unchecked backup is considered to be independent. If the type of the backup is connected, the unchecked backup is considered to be neither connected nor independent.

If the selected unchecked backup is not connector or independent, the method proceeds to Step 624. If the selected unchecked backup is connector or independent, the method proceeds to Step 628.

In one or more embodiments of the invention, when an unchecked backup is considered to be connected to another backup, the another backup may also be analyzed as described above in Step 624. This process may be repeated until either (i) an unconnected and dependent backup is identified or (ii) an independent backup is identified. Doing so may ensure that continuity chains of backups that include older members are regularly fully interrogated for staleness of members. Such continuity chains may have a higher likelihood of including stale members.

A similar analysis may be performed for younger members in the continuity chain, e.g., backups that are not members of the set of potentially stale backups but that depend on the selected unchecked backup. Doing so may proactively identify younger members of continuity chains that may be stale. By proactively identifying younger stale members of continuity chains, one or more embodiments of the invention may further improve the available storage capacity of computing devices without interrogating all of the backups and, thereby, conserve computing resources.

In Step 624, the selected unchecked backup is added to the set of stale backups.

In Step 626, it is determined whether all backups of the set of potentially stale backups have been checked. If all backups of the set of potentially stale backups have been checked, the method may end. If all of the backups of the set of potentially stale backups have not been checked, the method proceeds to Step 628.

In Step 628, the selected unchecked backup of the set of potentially stale backups is marked as checked.

While Step 628 indicates that the selected unchecked backup is marked, other methods of organizing checked and unchecked backups of the set of potentially stale backups maybe used without departing from the invention. For example, the set of potentially stale backups may be arbitrarily ordered and the loop of Steps 620-628 may simply be repeated until all of the backups of the set of potentially stale backups have been checked.

FIG. 7 shows a flowchart of a method in accordance with one or more embodiments of the invention. The method depicted in FIG. 7 may be used to storage a backup of a virtual machine in backup storage in accordance with one or more embodiments of the invention. The method shown in FIG. 7 may be performed by, for example, a remote backup agent (e.g., 110, FIG. 1). Other components of the system illustrated in FIG. 1 may perform the method of FIG. 7 without departing from the invention.

In Step 700, a backup generation for a virtual machine is initiated.

The backup generation may be initiated by sending a message to a production agent of a production host that request the backup generation to begin.

In Step 702, virtual machine data is stored in the backup storage.

In one or more embodiments of the invention, the virtual machine data is a backup of the virtual machine, or a portion thereof. The backup may be, for example, a virtual machine image, a difference disk, a log backup, or another data structure that maybe used to independently, or in combination with other backups, restore a virtual machine, or a portion thereof, to a prior state.

In Step 704, the most recently stored backup in the backup continuity chain associated with the virtual machine is identified.

For example, as seen in FIG. 5, each backup stored in the backup storage may be associated virtual a virtual machine. Each backup may further include a lifetime that indicates the age of the backup. These characteristics of backups in the backup storage may be filtered, or otherwise analyzed, to identify the most recently stored backup in the continuity chain. In one or more embodiments of the invention, the backups may be filtered to identify a subset that is associated with the virtual machine. The youngest backup of the subset may be identified as the most recently stored backup in the continuity chain.

In Step 706, the stored virtual machine data is connected with the most recently stored backup to extend the continuity chain.

In one or more embodiments of the invention, Step 706 is performed after Step 702. By doing so, only successfully stored virtual machine data will be connected to the most recently stored backup.

In one or more embodiments of the invention, the stored virtual machine data is connected by adding an identifier of the most recently stored backup. The identifier may be added to a name, meta data, or other data structure associated with the stored virtual machine data, e.g., stored backup.

The method may end following Step 706.

The method depicted in FIG. 7 may improve the operation of computing devices by providing a fault tolerant method for identifying backup failures. Since virtual machine data is not connected to other backups until after the virtual machine data is successfully stored, an inadvertent failure in the process of storing virtual machine data does not result in an addition to a continuity chain. Doing so would otherwise create a false impression of being able to perform a restoration using the errantly connected virtual machine data. Thus, one or more embodiments of the invention also improve the operation of distributed systems by enabling the distributed system to detect the presence of faults in continuity chains. Doing so enables the system to correct the faulty data and free computing resources, e.g., storage space.

To further clarify aspects of embodiments of the invention, a non-limiting example is provided in FIGS. 8A-8D.

Example

Figure 8A:
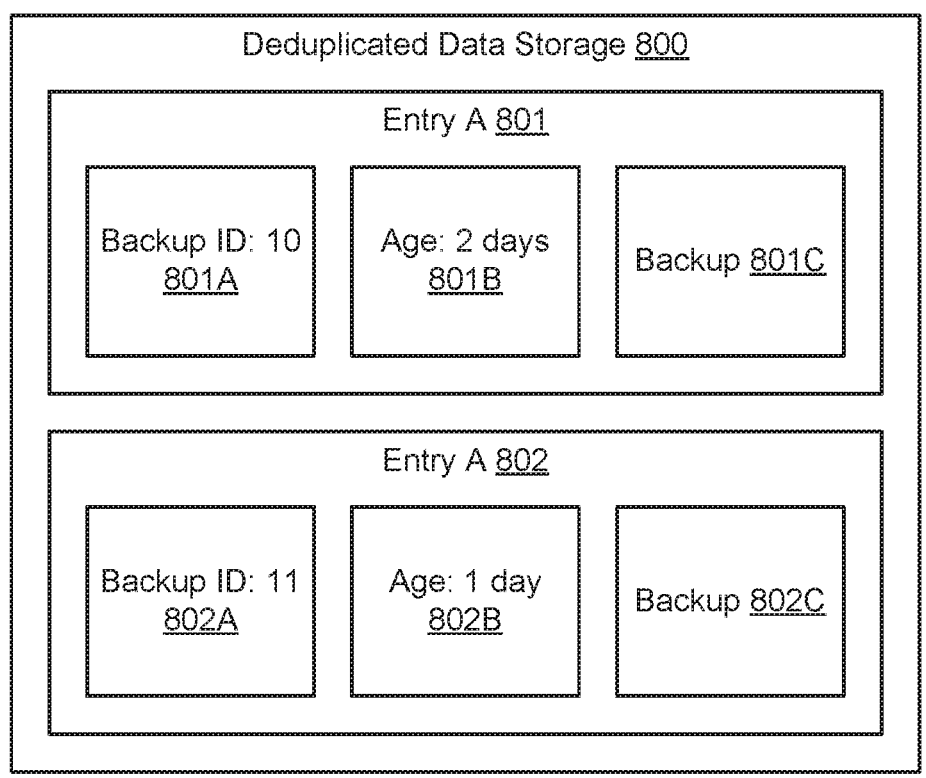
FIG. 8A shows a diagram of an example of a deduplicate storage at a first point in time.

Consider a scenario in which a deduplicated data storage (800) as illustrated in FIG. 8A is storing backups of a virtual machine. At day 2, the deduplicated data storage (800) includes two entries (801, 802) each corresponding to backups generated on day 1 and day 2 respectively. Garbage collection may be performed on the deduplicated data storage (800) after storage of Entry B (802) on day 2 with a threshold age of 5 days.

Figure 8B:
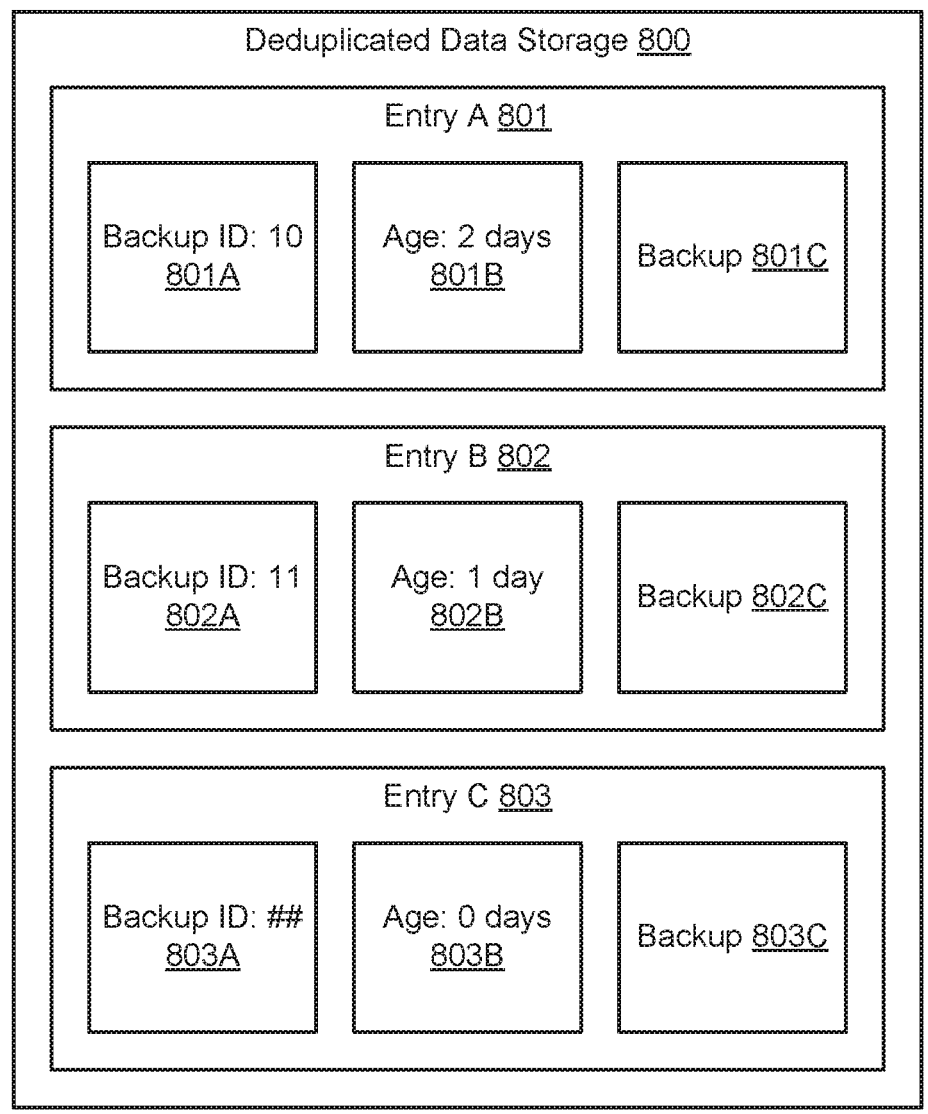
FIG. 8B shows a diagram of the example deduplicated storage of FIG. 7A at a second point in time.

On Day 3, a third entry, entry C (803), is stored include a corresponding backup (803C) for the virtual machine as illustrated in FIG. 8B. However, during generation and storage of the backup (803C), the process was unable to complete due to failure of the system hosting the virtual machine during backup generation. The failure in the backup storage resulted in Entry C (803) not including a portion of the backup identifier (803A) that includes an identifier of Entry B (802). This failure represents a break in the continuity chain.

Figure 8C:
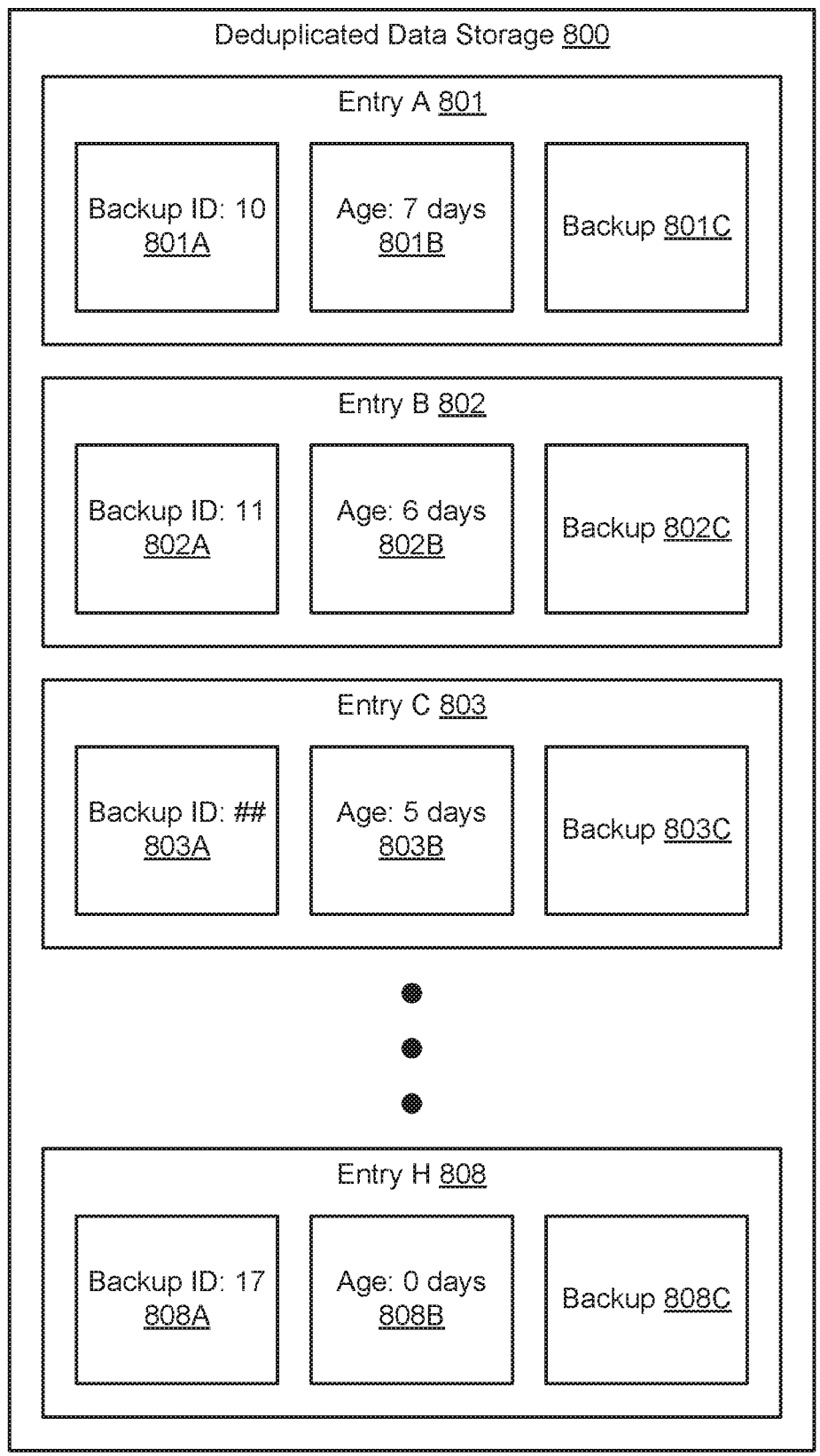
FIG. 8C shows a diagram of the example deduplicated storage of FIG. 7A at a third point in time.
Figure 8D:
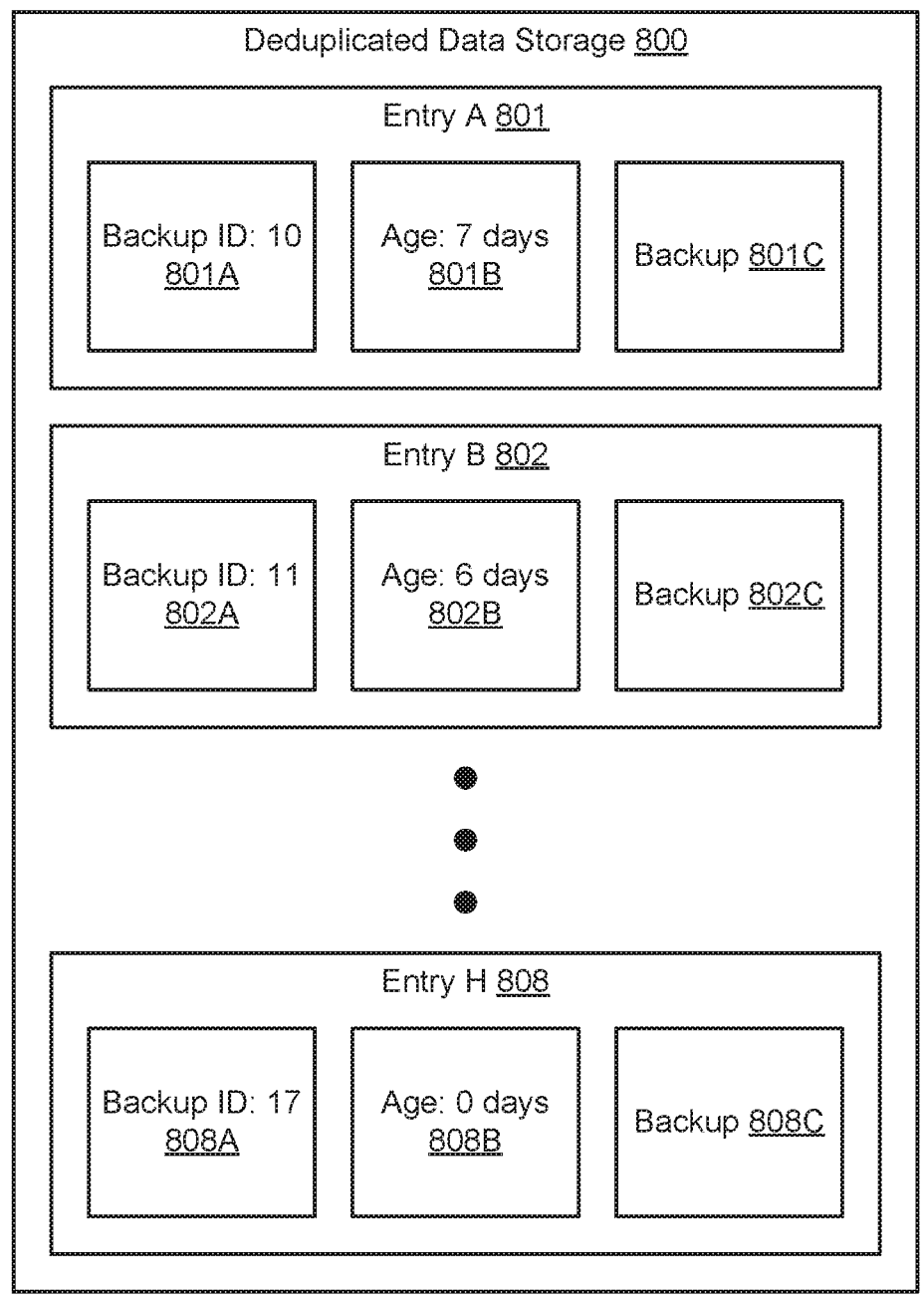
FIG. 8D shows a diagram of the example deduplicated storage of FIG. 7A at a fourth point in time.

Subsequent backups were performed on days 4-8 until the age of Entry C (803) met the 5 day threshold a shown in FIG. 8C. Due to the age of entry C (803), the entry was added to a set of potentially stale backups based on the date analysis. Entry C (803) was then subjected to a neither continuity analysis which identified that it was neither connected to another backup or independent. Entry C (803) was then deleted, as illustrated in FIG. 8D.

While not illustrated in FIG. 8D, younger members, e.g., Entry H (808), may also be subsequently deleted due to their dependence on now-deleted entry C. Older members, e.g., entry A (801) and entry B (802), may be been subject to a continuity analysis but, because of their proper dependence, were not deleted.

End of Example

Figure 9:
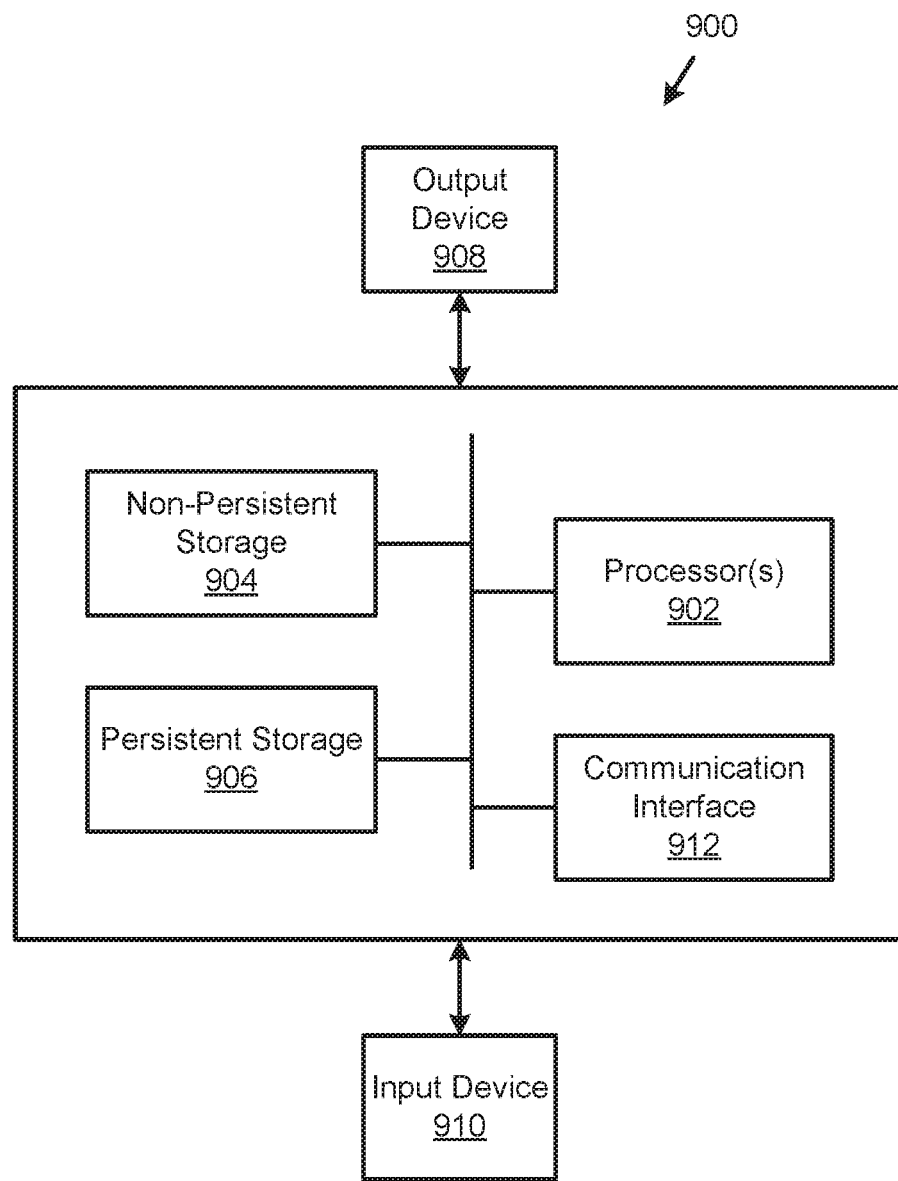
FIG. 9 shows a diagram of a computing device in accordance with one or more embodiments of the invention.

As discussed above, embodiments of the invention may be implemented using computing devices. FIG. 9 shows a diagram of a computing device in accordance with one or more embodiments of the invention. The computing device (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), input devices (910), output devices (908), and numerous other elements (not shown) and functionalities. Each of these components is described below.

In one embodiment of the invention, the computer processor(s) (902) may be an integrated circuit for processing instructions. For example, the computer processor(s) may be one or more cores or micro-cores of a processor. The computing device (900) may also include one or more input devices (910), such as a touchscreen, keyboard, mouse, microphone, touchpad, electronic pen, or any other type of input device. Further, the communication interface (912) may include an integrated circuit for connecting the computing device (900) to a network (not shown) (e.g., a local area network (LAN), a wide area network (WAN) such as the Internet, mobile network, or any other type of network) and/or to another device, such as another computing device.

In one embodiment of the invention, the computing device (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve computing devices by increase the available storage space. Embodiments of the invention may provide increased available storage space by removing useless backups. In one or more embodiments of the invention, the method of removing useless backups provides a two step framework that results in a (i) subset of backups that are more likely to be stale than other backups using a low computing resources use method and (ii) actually stale members of the subset of backups being identified using a higher computing resource use method. The two step framework provides a high accuracy identification of stale backups without imposing a significant computing resource load on the system.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A storage for storing backups of virtual machines, comprising:
   a persistent storage that stores backups; and
   a garbage collector programmed to:
   identify an end of a backup generation session;
   in response to identifying the end of the backup generation session:
   perform a date analysis to identify a set of potentially stale backups of the backups that each has a respective age greater than a threshold age;
   perform a continuity chain analysis of each backup of the set of potentially stale backups to identify a set of stale backups that each are not chained to other backups, wherein performing the continuity chain analysis comprises:
   selecting a first backup of the set of potentially stale backups
   reading a first file name of the first backup;
   extracting a first portion of the first file name, wherein the first portion of the first file name references a deleted backup;
   performing a first matching of the extracted first portion of the first file name to the respective file names of the backups;
   making a first determination that the first backup is not chained to any of the backups based on the first matching, wherein the deleted backup is not in the backups; and including, based on the first determination, the first backup in the set of stale backups; and
delete each backup of the set of stale backups.

2. The storage of claim 1, wherein the set of potentially stale backups include a plurality of backups of the backups.

3. The storage of claim 2, wherein the threshold age is based on an average age of the backups.

4. The storage of claim 1, wherein performing the continuity chain analysis of each backup of the set of potentially stale backups to identify the set of stale backups further comprises:
    selecting a second backup of the set of potentially stale backups;
    reading a second file name of the second backup;
    extracting a second portion of the second file name;
    performing a second matching of the extracted second portion of the second file name to respective file names of the backups;
    making a second determination that the second backup is chained to a third backup of the backups based on the second matching; and
    excluding the second backup from the set of stale backups.

5. The storage of claim 1, wherein the first backup of the backups is a member of the set of potentially stale backups.

6. The storage of claim 1, wherein performing the continuity chain analysis of each backup of the set of potentially stale backups to identify the set of stale backups further comprises:
    selecting a second backup of the set of potentially stale backups; and
    reading a dependency identifier of the second backup,
    wherein the dependency identifier is an identifier of a third backup of the backups.

7. The storage of claim 6, wherein the first backup is based on an image of a virtual machine of the virtual machines.

8. The storage of claim 7, wherein the second backup is based on a difference disk of the virtual machine of the virtual machines.

9. The storage of claim 7, wherein the first backup has a first age, the second backup has a second age, and the second age is smaller than the first age.

10. The storage of claim 7, wherein the virtual machine of the virtual machines is restorable to a first point in time associated with the first backup using only the first backup.

11. The storage of claim 10, wherein the virtual machine of the virtual machines is not restorable to a second point in time associated with the second backup using only the second backup.

12. The storage of claim 11, wherein the virtual machine of the virtual machines is restorable to the second point in time associated with the second backup using both of the first backup and the second backup.

13. A method for storing backups of virtual machines, comprising:
    identifying an end of a backup generation session;
    in response to the identification of the end:
        performing a date analysis to identify a set of potentially stale backups of the backups that each has a respective age greater than a threshold age;
        performing a continuity chain analysis of each backup of the set of potentially stale backups to identify a set of stale backups that each are not chained to other backups, wherein performing the continuity chain analysis comprises:
            selecting a first backup of the set of potentially stale backups;
            reading a first file name of the first backup;
            extracting a first portion of the first file name, wherein the first portion of the first file name references a deleted backup;
            performing a first matching of the extracted first portion of the first file name to the respective file names of the backups;
            making a first determination that the first backup is not chained to any of the backups based on the first matching, wherein the deleted backup is not in the backups; and
            including, based on the first determination, the first backup in the set of stale backups; and
        deleting each backup of the set of stale backups.

14. The method of claim 13, wherein the set of potentially stale backups include a plurality of backups of the backups.

15. The method of claim 14, wherein the threshold age is based on an average age of the backups.

16. A non-transitory computer readable medium comprising computer readable program code, which when executed by a computer processor enables the computer processor to perform a method for storing backups of virtual machines, the method comprising:
    identifying an end of a backup generation session;
    in response to the identification of the end:
        performing a date analysis to identify a set of potentially stale backups of the backups that each has a respective age greater than a threshold age;
        performing a continuity chain analysis of each backup of the set of potentially stale backups to identify a set of stale backups that each are not chained to other backups, wherein performing the continuity chain analysis comprises:
            selecting a first backup of the set of potentially stale backups
            reading a first file name of the first backup;
            extracting a first portion of the first file name, wherein the first portion of the first file name references a deleted backup;
            performing a first matching of the extracted first portion of the first file name to the respective file names of the backups;
            making a first determination that the first backup is not chained to any of the backups based on the first matching, wherein the deleted backup is not in the backups; and
            including, based on the first determination, the first backup in the set of stale backups; and
        deleting each backup of the set of stale backups.

17. The non-transitory computer readable medium of claim 16, wherein the set of potentially stale backups include a plurality of backups of the backups.

18. The non-transitory computer readable medium of claim 17, wherein the threshold age is based on an average age of the backups.

* * * * *